US006853161B2

(12) United States Patent
Kobayashi et al.

(10) Patent No.: US 6,853,161 B2
(45) Date of Patent: Feb. 8, 2005

(54) RECORDING APPARATUS, MOTOR CONTROL APPARATUS, AND MOTOR CONTROL METHOD

(75) Inventors: Nobutsune Kobayashi, Kanagawa (JP); Michiharu Shoji, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/626,623

(22) Filed: Jul. 25, 2003

(65) Prior Publication Data

US 2004/0140784 A1 Jul. 22, 2004

(30) Foreign Application Priority Data

Jul. 31, 2002 (JP) ...................................... 2002-223579

(51) Int. Cl.[7] ................................................ G05B 19/29

(52) U.S. Cl. ....................... 318/603; 318/602; 318/632; 318/638; 318/671; 347/10; 347/11

(58) Field of Search ................................ 318/600, 602, 318/603, 632, 638, 671; 347/10, 11, 14

(56) References Cited

U.S. PATENT DOCUMENTS

| | | | | | |
|---|---|---|---|---|---|
| 4,313,124 | A | | 1/1982 | Hara | |
| 4,345,262 | A | | 8/1982 | Shirato et al. | |
| 4,463,359 | A | | 7/1984 | Ayata et al. | |
| 4,723,129 | A | | 2/1988 | Endo et al. | |
| 4,740,796 | A | | 4/1988 | Endo et al. | |
| 6,183,151 | B1 | * | 2/2001 | Kono | 400/582 |
| 6,302,514 | B1 | * | 10/2001 | Eade et al. | 347/33 |
| 6,354,690 | B1 | * | 3/2002 | Murakami | 347/37 |
| 6,515,445 | B2 | | 2/2003 | Shoji et al. | |
| 6,592,198 | B2 | | 7/2003 | Shoji et al. | |
| 6,599,043 | B2 | | 7/2003 | Kobayashi et al. | |
| 2002/0171702 | A1 | | 11/2002 | Kobayashi et al. | |
| 2002/0172510 | A1 | | 11/2002 | Kobayashi et al. | |
| 2002/0172511 | A1 | | 11/2002 | Saito et al. | |
| 2003/0043220 | A1 | | 3/2003 | Shoji | |
| 2003/0052933 | A1 | | 3/2003 | Shoji | |

* cited by examiner

*Primary Examiner*—Rina Duda
(74) *Attorney, Agent, or Firm*—Fitzpatrick, Cella, Harper & Scinto

(57) ABSTRACT

A motor control apparatus which can improve detection accuracy of control information and stabilize a control system includes a detector for detecting first pulse information which corresponds to the drive speed of a driven object and second pulse information out of phase with the first pulse information; edge detectors for detecting rising edges and falling edges of the detected first pulse information and second pulse information; edge interval measuring units for measuring edge-to-edge periods using the detected rising edges and falling edges; a calibrator for calibrating the measured edge-to-edge periods with a reference period for driving the driven object at constant speed; a corrector for correcting the first pulse information and second pulse information based on the calibration; and a controller for generating control commands to drive the driven object based on the corrected first pulse information and second pulse information.

16 Claims, 14 Drawing Sheets

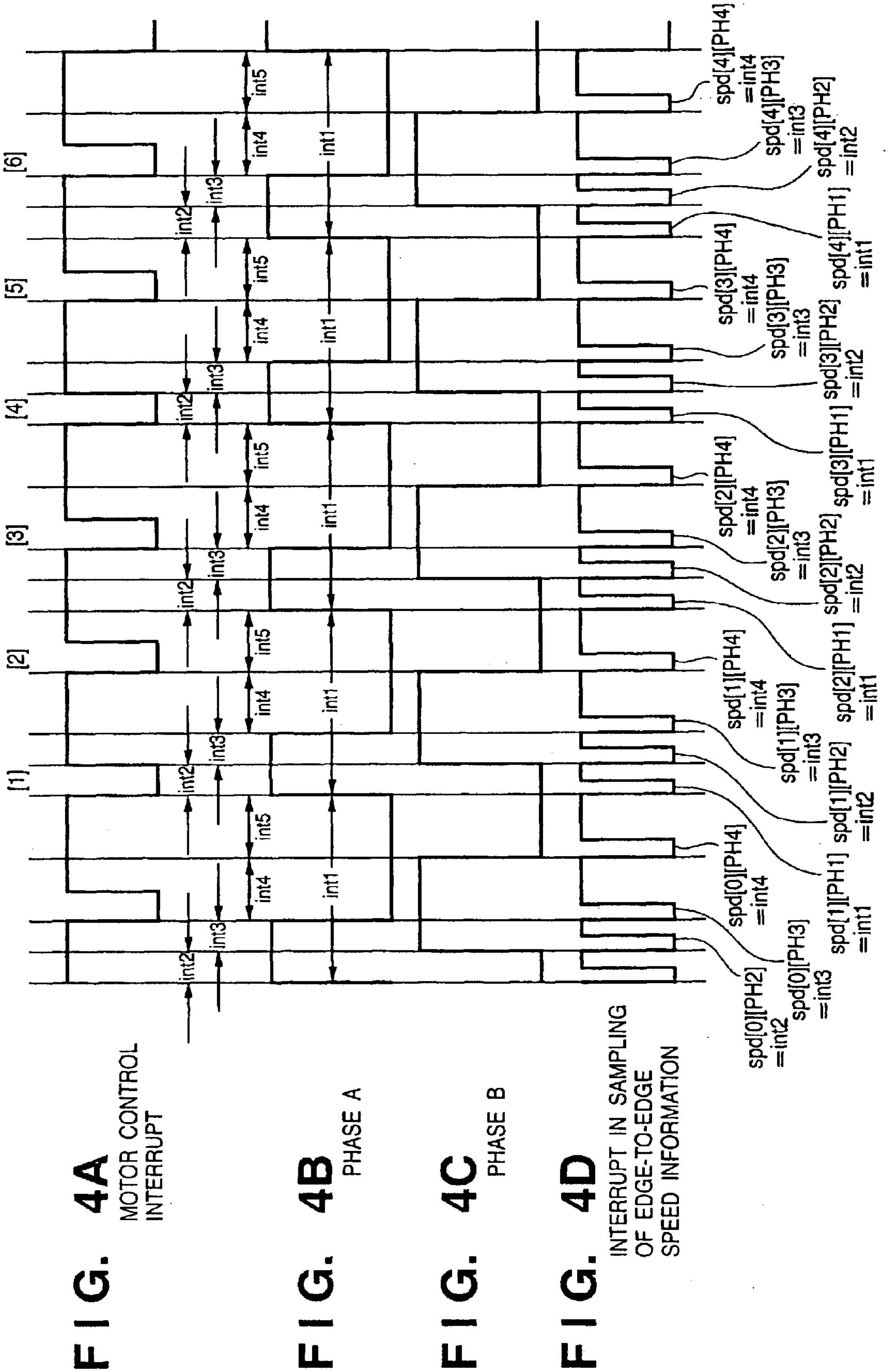
FIG. 4A MOTOR CONTROL INTERRUPT
FIG. 4B PHASE A
FIG. 4C PHASE B
FIG. 4D INTERRUPT IN SAMPLING OF EDGE-TO-EDGE SPEED INFORMATION

RECORDING APPARATUS, MOTOR CONTROL APPARATUS, AND MOTOR CONTROL METHOD

FIELD OF THE INVENTION

The present invention relates to a recording apparatus, motor control apparatus, and motor control method which are distinguished by controlling of a DC motor used as a driving source of the recording apparatus.

BACKGROUND OF THE INVENTION

Ink jet recording apparatuses are widely used, being mounted on a printer, facsimile machine, or copying apparatus, as a means of recording images (including characters and symbols) on a recording medium such as paper or plastic sheets (OHP or the like) based on image information. The ink jet recording apparatuses perform recording by discharging ink droplets onto a recording medium from a recording head. They have the advantage that they can downsize a mechanism for performing recording processes and can record accurate images at high speed. Moreover, they feature low running costs and have a low noise level because of their non-impact design. In addition, they can easily record color images using inks other than black: cyan (C), magenta (M), yellow (Y), etc.

Driving sources for ink jet recording apparatuses include a carriage motor which drives a carriage carrying the recording head in the scanning direction in a reciprocating manner, a transport motor (ASF motor) which feeds the recording medium to the ink jet recording apparatus, a recovery system motor for doing head cleaning, a paper feed motor which feeds the recording medium for each print scan, etc. Conventionally, stepping motors are often used as driving sources because of low cost and the ease with which they can be controlled.

Although ink jet recording apparatuses do not produce much noise during recording because of their non-impact design as described above, DC motors are increasingly used as driving sources in order to further reduce noise. An encoder is generally used as a detector to obtain control information about DC motors (such as positional information and speed information).

FIG. 1 is a diagram modeling a principle of signal detection in an encoder. In the encoder, light emitted from an LED 101 is detected through a code wheel 102 by a detector 103, which consequently generates a signal. The code wheel 102 is patterned with slit segments 104 that transmit light from an LED 101 and segments 105 that do not transmit light alternating at predetermined intervals. The detector 103 contains photodiodes 106, 107, 108, and 109 placed at predetermined intervals, converts the light detected by the photodiodes 106, 107, 108, and 109 into respective electrical signals A (110), *A (111), B (112), and *B (113), and outputs them. Then, the electrical signals 110, 111, 112, and 113 are output as differential outputs Channel A (116) and Channel B (117) by comparators 114 and 115.

FIG. 2 shows a waveform of a differential output signal. At intersections of electrical signal A (201) and electrical signal *A (202), rectangular pulse waveform Channel A (203) is switched between a rise (High) and fall (Low). If speed is constant, intersections of electrical signal A and electrical signal *A occur at regular intervals. Thus, ideally the duty cycle (ratio between High state and Low state) of Channel A (203) is 50%. However, the duty cycle can vary due to various factors, the main one of which is sensitivity difference between photodiodes.

FIG. 3 shows a waveform of a differential output signal obtained when there is a sensitivity difference between photodiodes. The sensitivity difference between photodiodes manifests itself as a difference in electrical signal amplitude. In FIG. 3, when the amplitude of electrical signal A (301) becomes smaller than that of electrical signal *A (302), the duty ratio of Channel A (303) exceeds 50% (HD>50%) in High state and falls below 50% (HD<50%) in Low state. As can be seen from FIG. 3, the sensitivity difference between photodiodes affects the duty ratio of the output signal, but it does not affect the period of Channel A (303). Thus, the period determined from phase A and phase *A (phase B and phase *B as well) of the output signal from an encoder provides accurate information regardless of the sensitivity of photodiodes.

When detecting positional information or speed information as control information about DC motors from an encoder signal, a single-edge sampling method is used to obtain more accurate information, where the single-edge sampling method consists of counting the period from a rise to the next rise of the encoder output signal using cycle information for which high precision is ensured.

However, speed information obtained by the single-edge sampling method is updated only after the encoder output signal goes through one cycle. That is, speed information is updated at ½ the frequency of a double-edge sampling method (which detects both rises and falls of the pulses, for example, in the pulse waveform shown in FIG. 3) and only ¼ as much speed information can be obtained as when both edges of two phases Channel A and Channel *A are sampled.

Now consider, for example, carriage control for ink jet recording apparatus. First the paper is fed at high speed and then low-speed servo control is started a little before a stop position. Then, just before the target stop position, stop mode is entered and the paper is stopped at the target position. In this case, the stopping accuracy of the paper depends heavily on how the low-speed servo control is stabilized a little before the stop position. During such low-speed driving, naturally the encoder signal changes slowly and speed information is updated at long intervals in the single-edge sampling method. Thus, in servo control of a motor, any time lag between a current feature value of the controlled object and speed information fed back can make the servo operation unstable.

If the double-edge sampling method is used to solve the above problem, although speed information is updated at shorter intervals, the accuracy of detecting speed information decreases due to variations in the duty cycle for the reasons described above, making the servo operation unstable.

SUMMARY OF THE INVENTION

In view of the above problems, the present invention has an object to provide a motor control apparatus and the like which correct double-phase, double-edge sampling data, and thereby achieve detection accuracy equivalent to that achievable by a conventional, single-phase, single-edge sampling method when obtaining control information from encoder output signals.

It also has an object to provide a motor control apparatus and the like which stabilize motor control by updating control information at shorter intervals than the conventional, single-phase, single-edge sampling method.

To achieve the above objects, a motor control apparatus and recording apparatus according to the present invention preferably have the following configurations.

That is, the above-described object of the present invention is achieved by a motor control apparatus comprising:

pulse signal generating means for generating a first pulse signal whose period corresponds to the speed at which a driven object moves and a second pulse signal out of phase with the first pulse signal;

edge detection means for detecting rising edges and falling edges of the first and second pulse signals;

edge interval information acquisition means for acquiring information about intervals between the edges of either the first or second pulse signal detected by the edge detection means and the edges of the other pulse signal detected next;

correction value acquisition means for acquiring correction values for the intervals between the edges of either the first or second pulse signal and the edges of the other pulse signal detected next; and control means for controlling movement of the driven object based on the information acquired by the edge interval information acquisition means and on the correction values.

The above-described object of the present invention is achieved by a recording apparatus which performs recording by causing a carriage carrying a recording head to scan over a recording medium, based on information transmitted from an external device, the recording apparatus comprising:

recording data generating means for converting the information transmitted from the external device into recording data compatible with configuration of the recording head;

pulse signal generating means for generating a first pulse signal whose period corresponds to transport speed of recording medium and a second pulse signal out of phase with the first pulse signal; and control means for controlling the scanning of the recording head and transport of the recording medium, wherein the control means comprises:

edge detection means for detecting rising edges and falling edges of the first and second pulse signals;

edge interval information acquisition means for acquiring information about intervals between the edges of either the first or second pulse signal detected by the edge detection means and the edges of the other pulse signal detected next;

correction value acquisition means for acquiring correction values for the intervals between the edges of either the first or second pulse signal and the edges of the other pulse signal detected next; and second control means for controlling movement of the recording apparatus based on the information acquired by the edge interval information acquisition means and on the correction values.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIGS. 4A to 4D are diagrams illustrating a calibration process;

DETAILED DESCRIPTION OF THE PREFERRED EMBODIMENTS

Preferred embodiments of the present invention will be described in detail with reference to the accompanying drawings.

In the following description of embodiments, a printer will be taken as an example of a recording apparatus which employs an ink jet recording method.

The term "record" (or "print") herein not only means the act of forming meaningful information such as characters and graphics, but also refers broadly to the act of forming images, patterns, etc. on a recording medium or processing a medium regardless of whether they are meaningful or meaningless and irrespective of whether they are tangible enough to be perceived by the human eye.

Also, the term "recording media" not only refers to paper used on typical recording apparatus, but also refers broadly to cloth, plastic films, metal plates, glass, ceramics, wood, leather, and other materials which accept ink.

Also, the term "ink" (or "liquid"), which should be interpreted broadly as is the case with the term "record" (or "print"), refers to a liquid which, when applied to recording media, can be used to form images, patterns, etc., to process the recording media, or to treat ink (e.g., to solidify color materials contained in the ink applied to the recording media or to make them insoluble).

[Outline of Main Unit]

Figure 12:
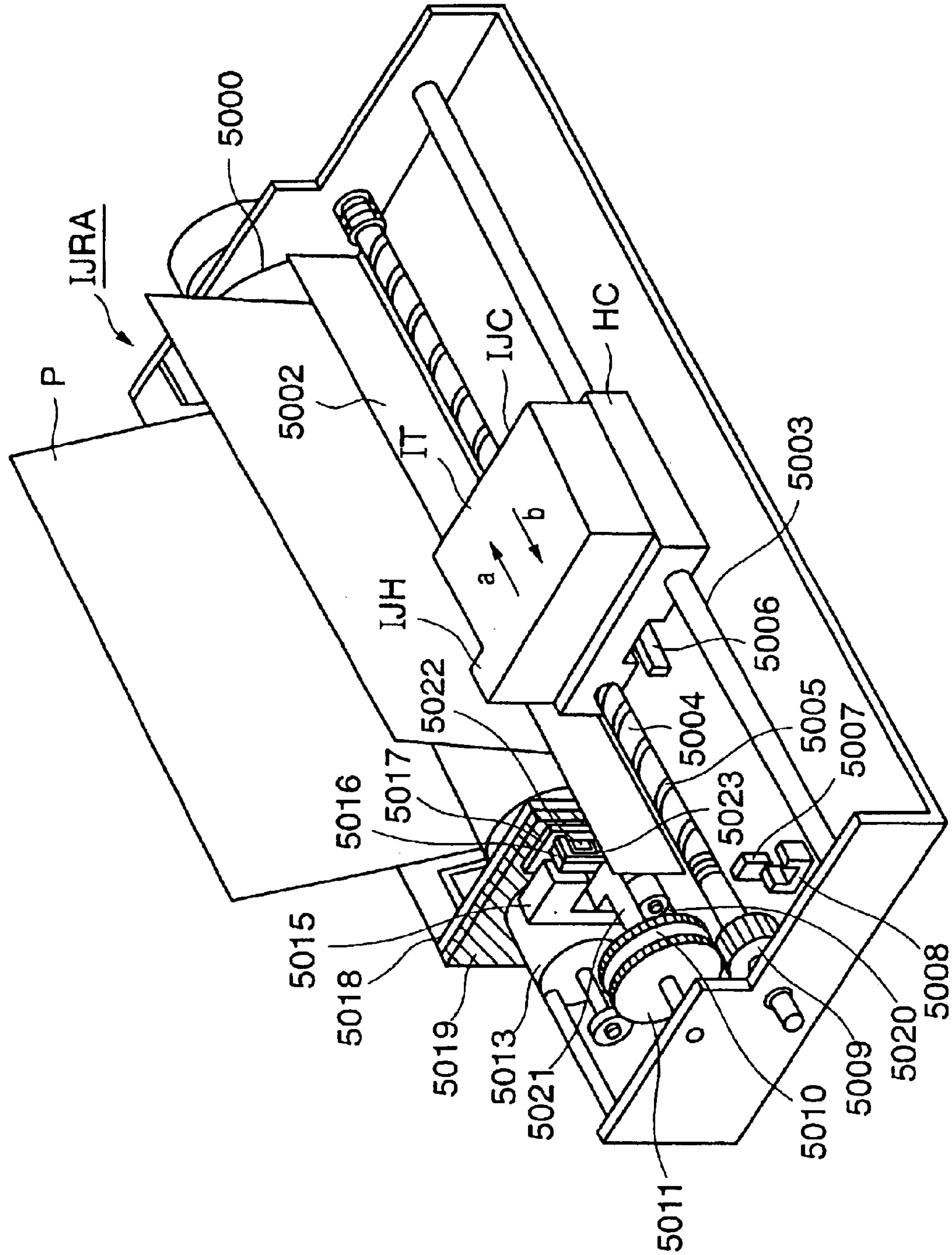
FIG. 12 is a diagram showing appearance of a printer which is a preferred embodiment of the present invention.

FIG. 12 is an external perspective view outlining a configuration of a printer IJRA which is a representative preferred embodiment of the present invention. In FIG. 12, a carriage HC moves to and fro along arrows a and b, being supported by a guide rail 5003 and being engaged via a pin (not shown) with a spiral groove 5005 of a lead screw 5004 which rotates via transmission gears 5009 to 5011 in synchronization with forward and reverse rotations of a drive motor 5013. Also, the carriage HC carries an integral-type ink jet cartridge IJC which incorporates a recording head IJH and ink tank IT.

Reference numeral 5002 denotes a paper bail, which presses recording paper P against a platen 5000 along the traveling direction of the carriage HC. Reference numerals 5007 and 5008 denote photocouplers which serve as home position detectors which sense the presence of a carriage lever 5006 in their respective coverage area to switch the rotational direction of the motor 5013, etc.

Reference numeral 5016 denotes a member for supporting a cap 5022 which covers the front face of the recording head IJH. Reference numeral 5015 denotes an aspirator used to effect suction recovery of the recording head via an opening 5023 in the cap. Reference numeral 5017 denotes a cleaning blade and 5019 denotes a member which makes the blade movable back and forth. These members are supported by a body support plate 5018. Needless to say, a known cleaning blade may be applied to the blade used here.

Reference numeral 5021 denotes a lever used to start suction recovery. The lever moves along with a cam 5020 engaged with the carriage, and driving force supplied from the drive motor is switched by a known transmission mechanism such as a clutch.

The capping, cleaning, and suction recovery described above are effected by the lead screw 5004 to effect desired processing at appropriate positions when the carriage approaches its home position. However, any other method may be used as long as desired operations are performed with known timing.

[Description of Control Configuration]

Now, description will be given of a control configuration for recording control on the above apparatus.

Figure 13:
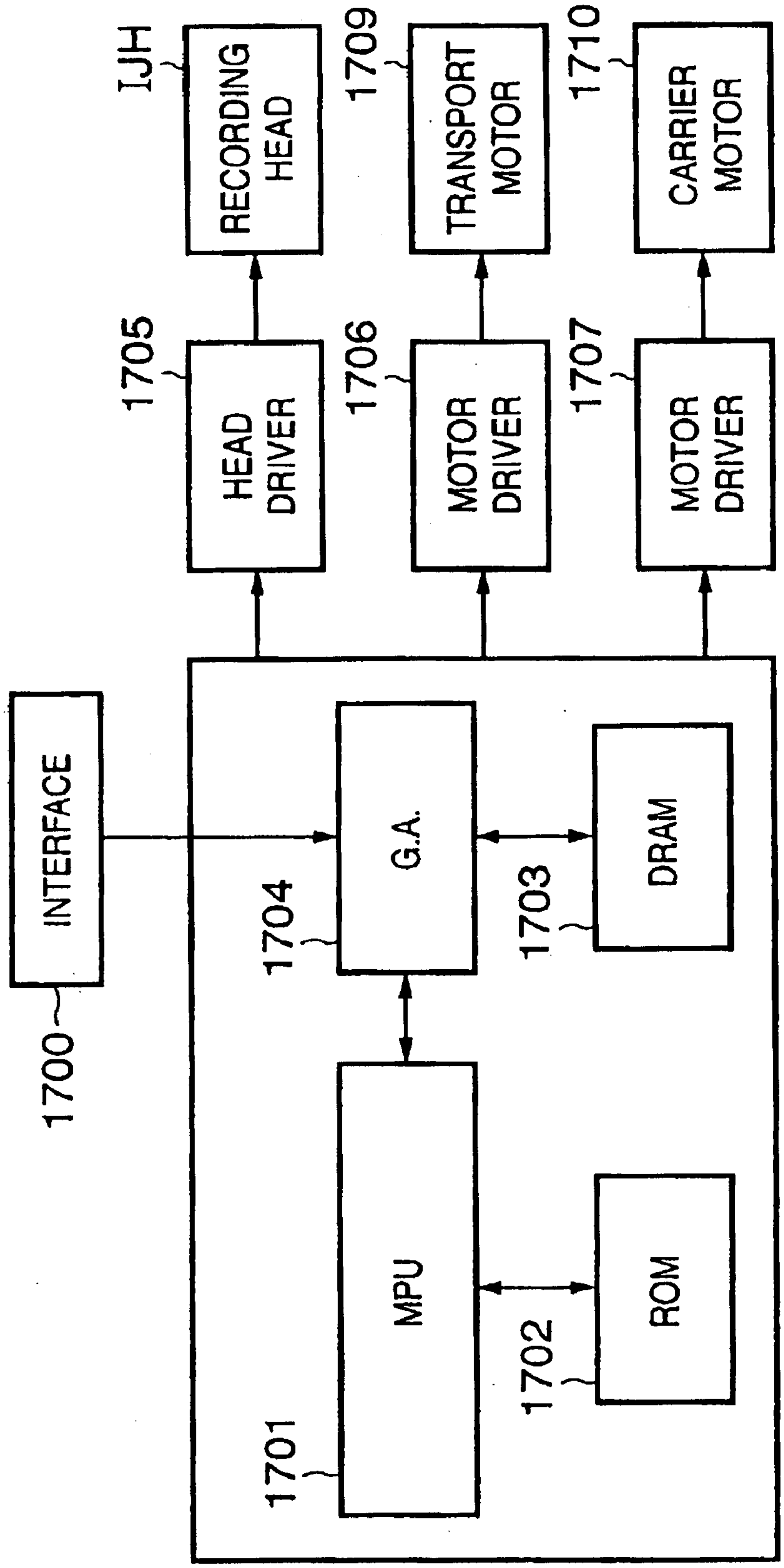
FIG. 13 is a block diagram showing a control configuration of the printer shown in FIG. 12.

FIG. 13 is a block diagram showing a configuration of a control circuit in the ink jet printer IJRA. In the figure, which shows the control circuit, reference numeral 1700 denotes an interface for receiving recording signals, 1701 denotes an MPU, 1702 denotes a ROM for storing control programs executed by the MPU 1701, and 1703 denotes a DRAM for storing various data (e.g., the recording signals described above, recording data supplied to the head, etc.). Reference numeral 1704 denotes a gate array (GA) which controls the supply of recording data to the recording head IJH and transfer of data among the interface 1700, MPU 1701, and RAM 1703. Reference numeral 1710 denotes a carrier motor for feeding the recording head IJH and 1709 denotes a transport motor for transporting recording paper. Reference numeral 1705 denotes a head driver which drives the recording head. Reference numeral 1706 and 1707 denote motor drivers which drive the transport motor 1709 and carrier motor 1710, respectively.

Operation of the above control configuration will be described. When a recording signal enters the interface 1700, the recording signal is converted into print recording data between the gate array 1704 and MPU 1701. Then, the motor drivers 1706 and 1707 operate and the recording head is driven in accordance with the recording data supplied to the head driver 1705, to perform recording.

Although the control programs executed by the MPU 1701 are stored in the ROM 1702 according to this example, if a rewritable recording medium such as an EEPROM is added, it is possible to allow the control programs to be modified from a host computer connected with the ink jet printer IJRA.

Incidentally, the ink tank IT and recording head IJH may be combined into a single unit—a replaceable ink cartridge IJC—as described above, but alternatively they may be made separable so that the ink tank IT can be replaced separately when it runs out of ink.

Figure 14:
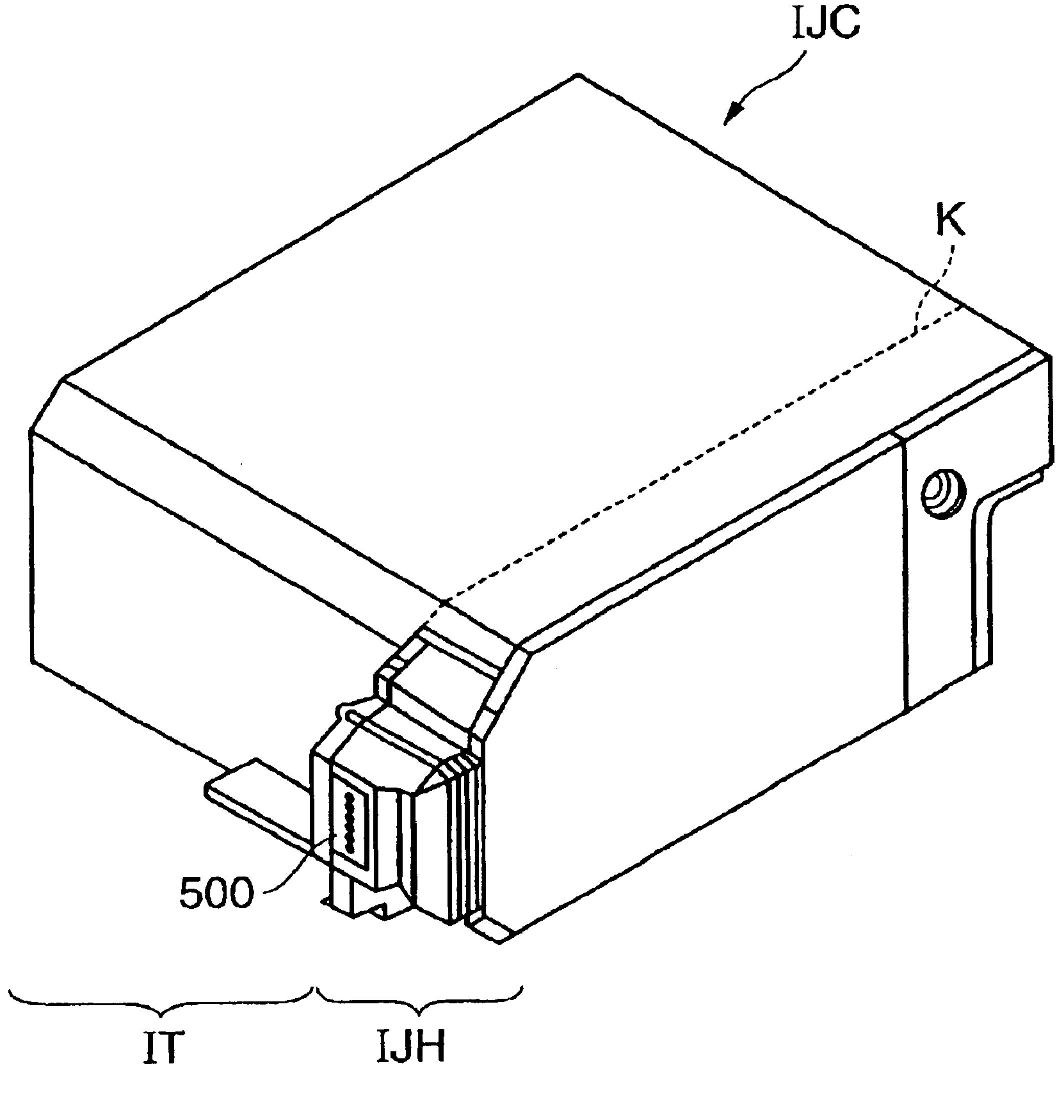
FIG. 14 is a diagram showing an ink jet cartridge for the printer shown in FIG. 12.

FIG. 14 is an external perspective view showing a configuration of the ink cartridge IJC in which the ink tank and head are separable. The ink cartridge IJC can be separated into the ink tank IT and recording head IJH at a boundary K as shown in FIG. 14. The ink cartridge IJC is equipped with electrodes (not shown) to receive an electrical signal supplied from the carriage HC when mounted on the carriage HC. The electrical signal causes the recording head IJH to be driven to discharge ink as described above.

In FIG. 14, reference numeral 500 denotes a series of ink discharge orifices. Also, the ink tank IT is provided with a fibrous or porous ink absorber to hold ink.

Next, description will be given of how the transport motor 1709 and the like (FIG. 13) are controlled in the above configuration.

[First Embodiment]

With reference to drawings, detailed description will be given of how the motors are controlled in the above described recording apparatus. FIGS. 4A to 4D are diagrams illustrating a calibration process.

FIG. 4A shows a waveform of an interrupt signal for motor control which is based on detection information. This interrupt signal is output periodically from a servo controller described later.

FIGS. 4B and 4C show output waveforms of different phases A and B produced by an encoder (e.g., rotary encoder), and FIG. 4D shows an edge-to-edge sampling waveform of speed information. The interrupt signal in FIG. 4A looks as if it were synchronized with the signals outputted from the encoder in FIGS. 4B and 4C, but actually it has predetermined cycles (servo cycles) and are not synchronized with the encoder signals.

Constant-speed driving is performed by single-phase, single-edge (int1 in FIGS. 4A to 4D) speed information which high accuracy is ensured, and speed information included in interval int1, edge-to-edge intervals int2 to int5 in each phase, are detected.

Edge intervals int2 to int5 are defined as follows.

int2: from rise of phase A to rise of phase B int3: from rise of phase B to fall of phase A int4: from fall of phase A to fall of phase B int5: from fall of phase B to next rise of phase A As can be seen from FIGS. 4A to 4D, one single-phase, single-edge interval (int1 in FIGS. 4A to 4D) corresponds to four double-phase, double-edge intervals.

The information detected here is stored as an array spd[SampleCount][EdgeNumber]. The information in the array is averaged to show average trends in the speed information in edge intervals int2 to int5 by eliminating sudden disturbances. In int1, the drive speed selected for constant-speed driving should not be too slow. Since the drive speed is constant, the counts in all int2 to int5 should theoretically be ¼ the count in int1, but there are deviations because of encoder error. For example, edge intervals int2 to int5 in FIG. 4 are given by:

$$int2=int3=\tfrac{1}{4}\times int1\times(\tfrac{2}{3}) \qquad (a)$$

$$int4=int5=\tfrac{1}{4}\times int1\times(\tfrac{4}{3}) \qquad (b)$$

where (⅔) and (4/3) are correction values (coefficient values) used to correct variations in duty ratios described in detail later.

The correction coefficient values are calculated based on sampled data and the relationships in Equations (a) and (b)

are calculated by a controller of the recording apparatus (MPU 1701 in FIG. 13).

Figure 1:
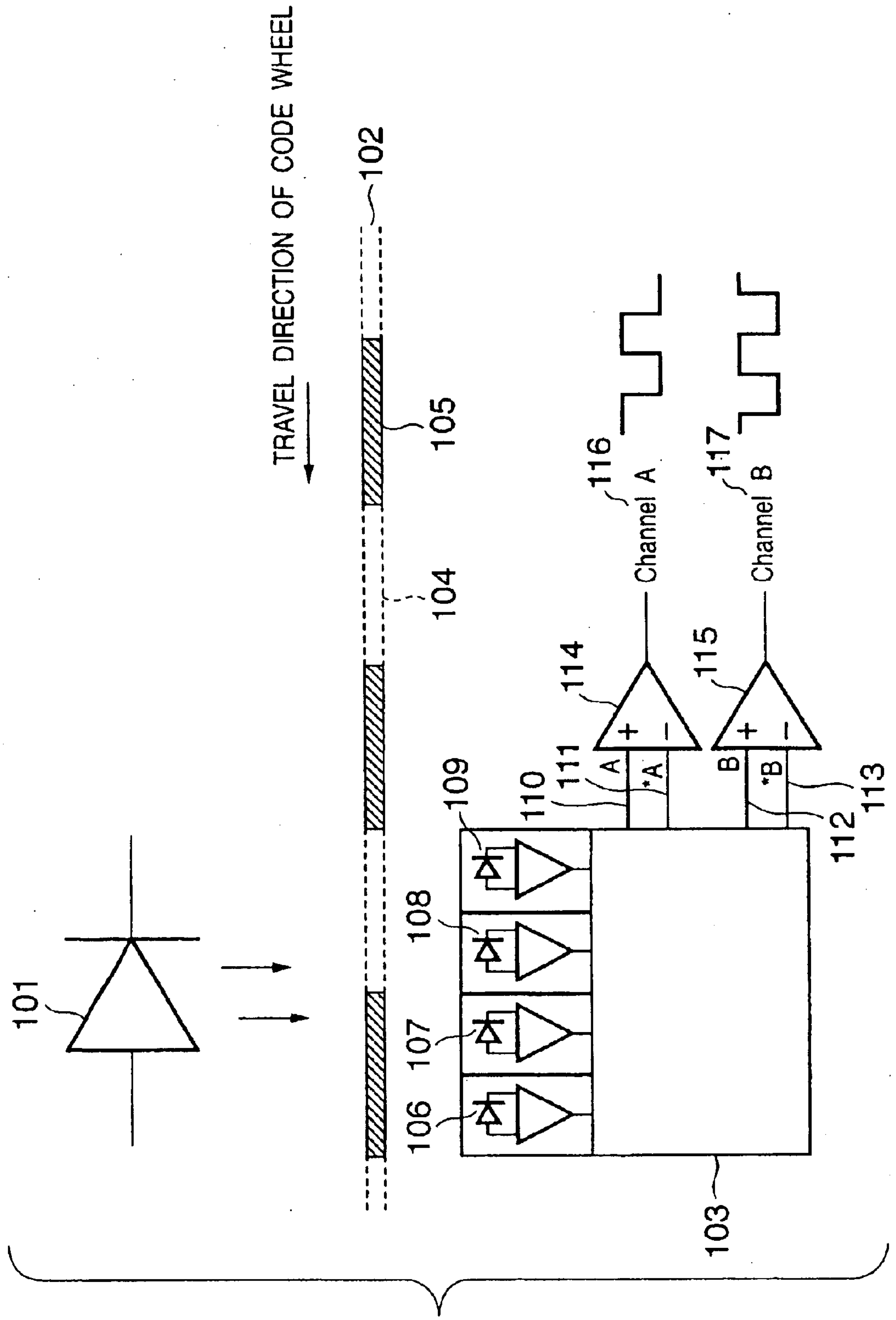
FIG. 1 is a diagram modeling a principle of signal detection in an encoder.
Figure 2:
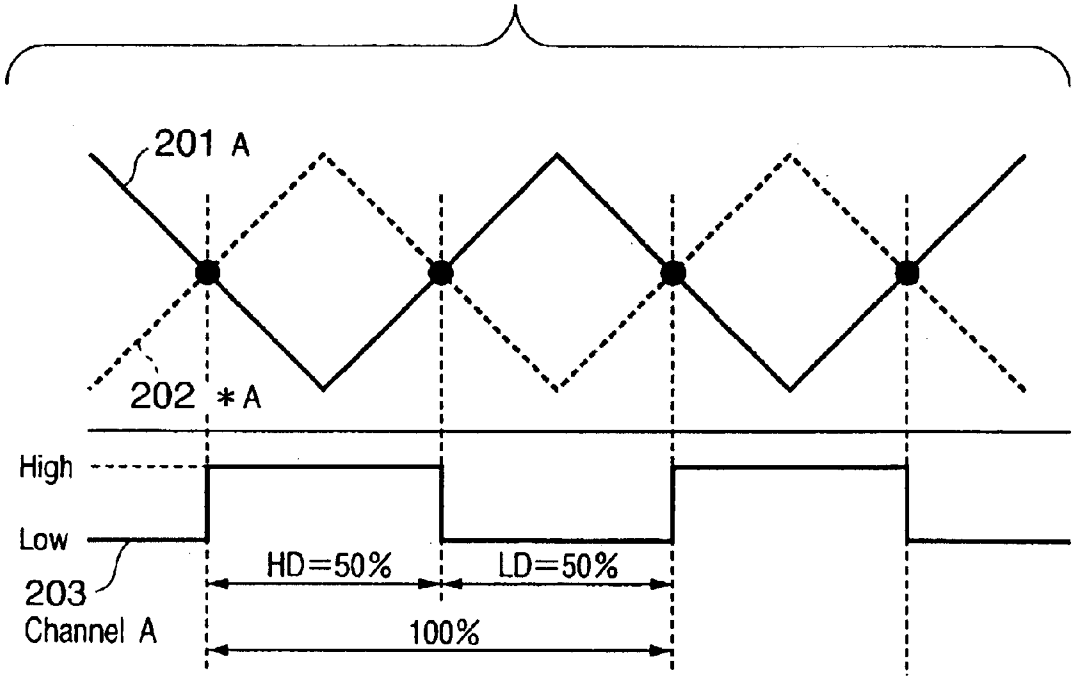
FIG. 2 is a diagram showing a waveform of a differential output signal from the encoder.
Figure 3:
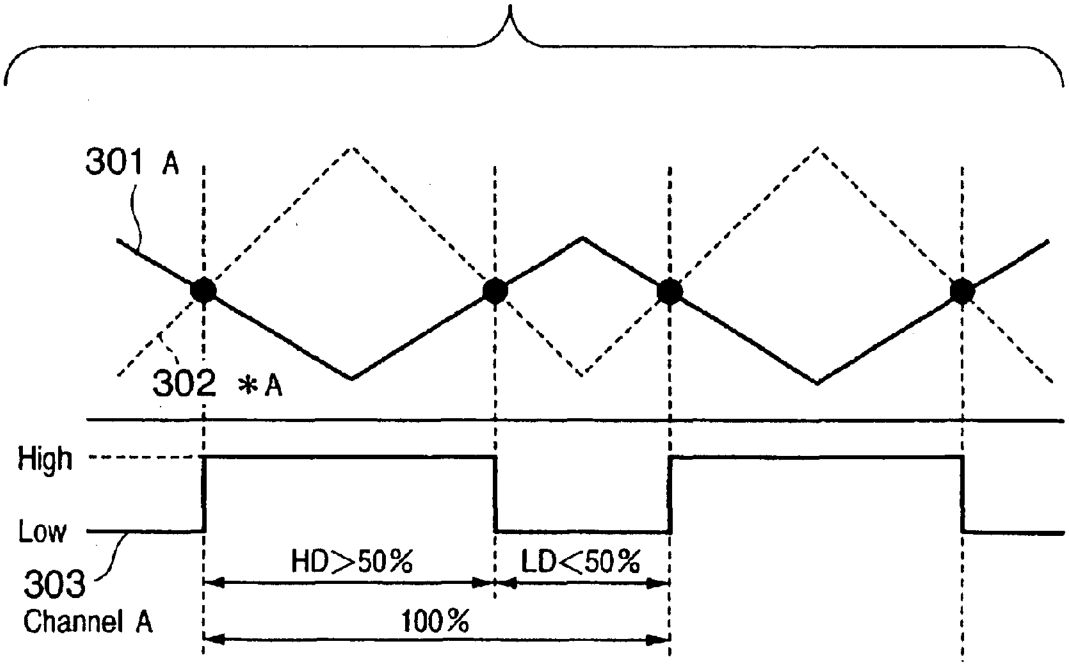
FIG. 3 is a diagram showing a waveform of a differential output signal obtained when there is a sensitivity difference between photodiodes.
Figures 5A, 5B, 5C:
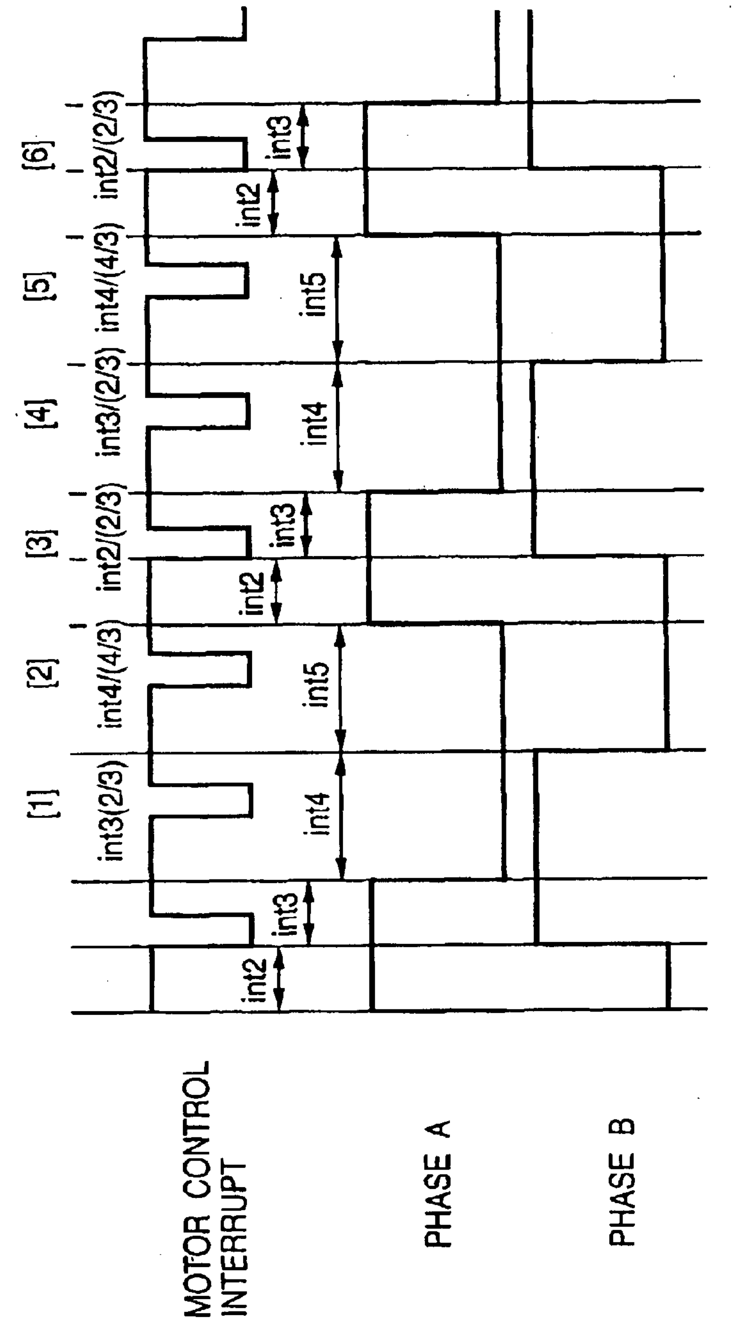
FIGS. 5A to 5C are diagrams illustrating a correction process.

FIGS. 5A to 5C are diagrams illustrating processing performed by correction means. They illustrate the process of controlling a motor by applying coefficient values obtained by a calibration process to servo control. FIG. 5A shows a waveform of an interrupt signal for motor control, the same waveform as in FIG. 4A. FIGS. 5B and 5C show output waveforms of phases A and B produced by the encoder.

At interrupt [1] in FIG. 5A, for example, control is performed using more accurate speed by applying the correction value (coefficient value ⅔) determined through the calibration in FIG. 4 to the latest speed information int3. Similarly, at interrupt [2], control is performed using the speed obtained by applying the correction value (coefficient value 4/3) determined through the calibration to the latest speed information int4. Through this interrupt processing, encoder speed information is converted and PID calculation is performed, as described later. Consequently, the speed of the DC motor is controlled by varying the current for the DC motor.

In this way, corrected speed information can be obtained by multiplying detected raw speed information by correction coefficient values.

That is, the accuracy of motor speed control can be increased by determining coefficient values for correcting variations in the information detected by the encoder and reflecting them in measured data.

[Description of Motor Control Block (FIG. 6)]

Figure 6:
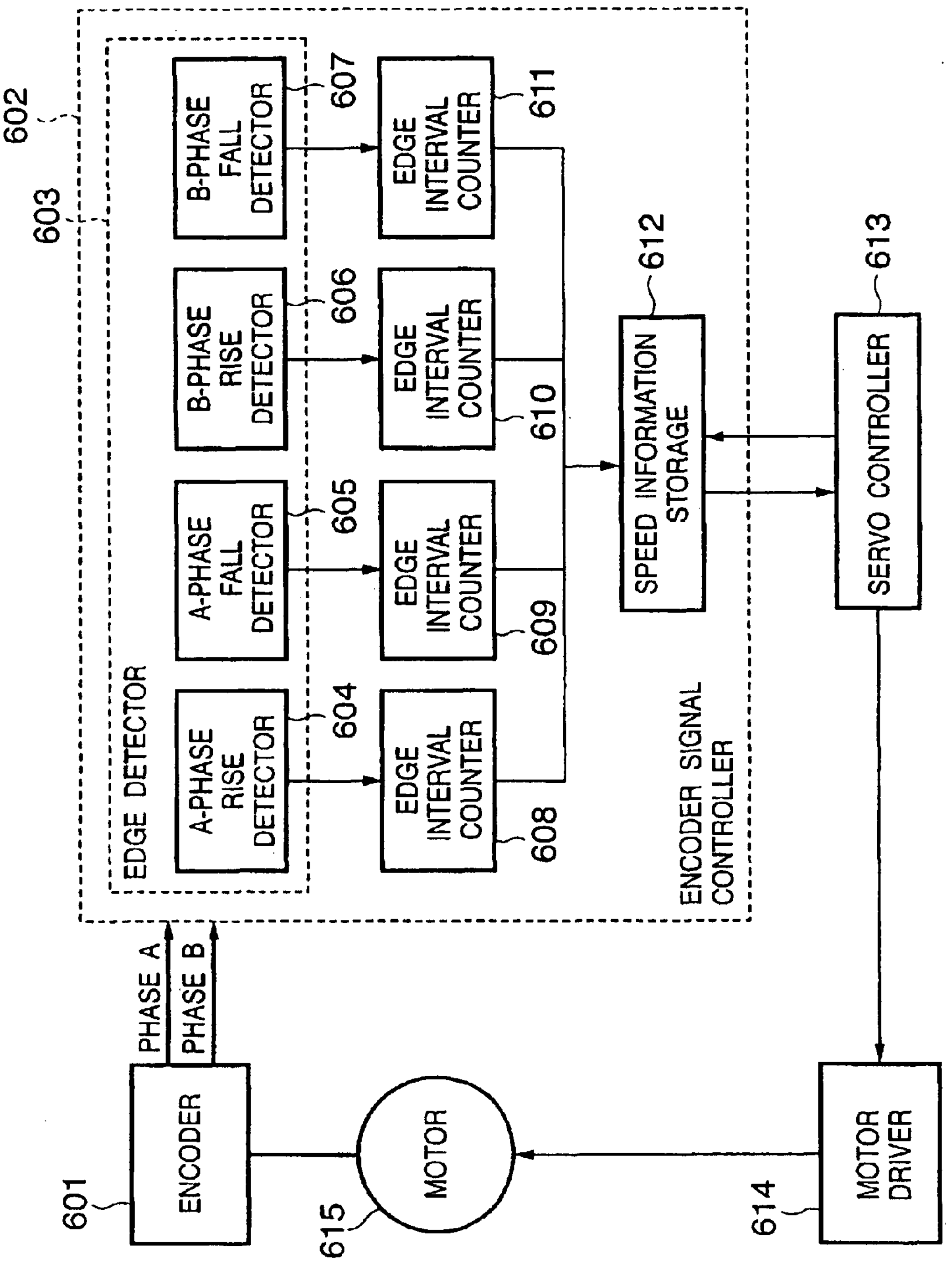
FIG. 6 is a control block diagram for generating control commands by reflecting corrections.

FIG. 6 is a control block diagram for controlling the motor. As a motor 615 operates, an encoder 601 detects two signals—an A-phase signal and B-phase signal—out of phase with each other and outputs them to an encoder signal controller (encoder signal processor) 602, which contains an edge detector 603 for detecting edges of the encoder signals.

The edge detector 603 includes an A-phase rise detector 604, A-phase fall detector 605, B-phase rise detector 606, and B-phase fall detector 607, which detect edges in respective phases independently and generate signals in synchronization with the edges. The signals synchronized with the edges of the different types are sent to edge interval counters 608, 609, 610, and 611, which count respective edge-to-edge intervals independently.

The edge interval counters 608, 609, 610, and 611 receive respective edge detection signals from the edge detector 603. They update speed information in a speed information storage 612 each time an edge interval is determined. When a servo cycle corresponding to predetermined intervals is entered, a servo controller 613 reads data out of the speed information storage 612 to obtain speed information needed for servo control. The servo controller 613 performs computations based on the obtained speed information, positional information, etc. and outputs optimum motor control information to a motor driver 614. The motor driver 614 produces output to the motor 615 based on the inputted control information to drive the motor 615.

[Generating Speed Information Based on Single-Phase, Single-Edge Sampling (FIG. 7)]

Figure 7:
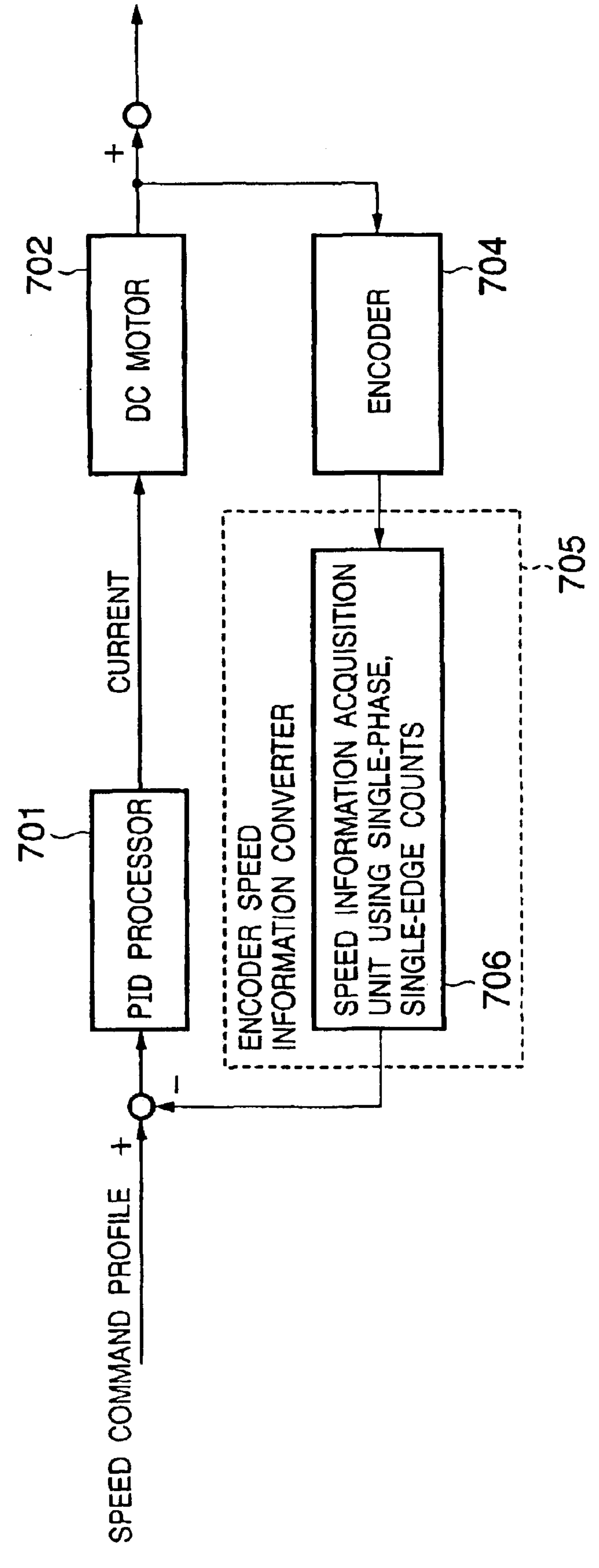
FIG. 7 is a PID-based control block diagram for generating speed information based on single-phase, single-edge sampling counts.

FIG. 7 is a PID-based control block diagram for generating speed information based on single-phase, single-edge sampling counts. First, a target speed for the controlled object is provided in the form of a speed profile. The profile is a speed information table. It generally forms a gentle cubic curve or similar curve and follow-up control of the profile makes it possible to satisfy mechanical requirements, and thereby accelerate or decelerate the motor.

A DC motor 702 rotates providing a driving force according to applied current under the influence of disturbances and information about the rotational speed is detected by an encoder 704 as an electrical signal. The detected electrical signal is converted by an encoder speed information converter 705 into speed information to be input in a PID processor 701.

Reference numeral 706 denotes a speed information acquisition unit which generates single-phase, single-edge interval speed information. Calibration is performed by the speed information converter 705 in the manner described with reference to FIGS. 4A–4D. Since single-phase, single-edge counts are updated at low frequencies, the drive speed selected for constant-speed driving should not be too slow.

The PID processor 701 is supplied with the difference between the speed command profile and speed information and calculates feature values (e.g., energy needed to drive the DC motor) to be given to the DC motor at that time using known PID operations. The results of calculation are converted into a current value and inputted in the DC motor to drive the motor. Subsequently, this closed loop implements speed control.

[Generating Speed Information Based on Double-Phase, Double-Edge Sampling (FIG. 8)]

Figure 8:
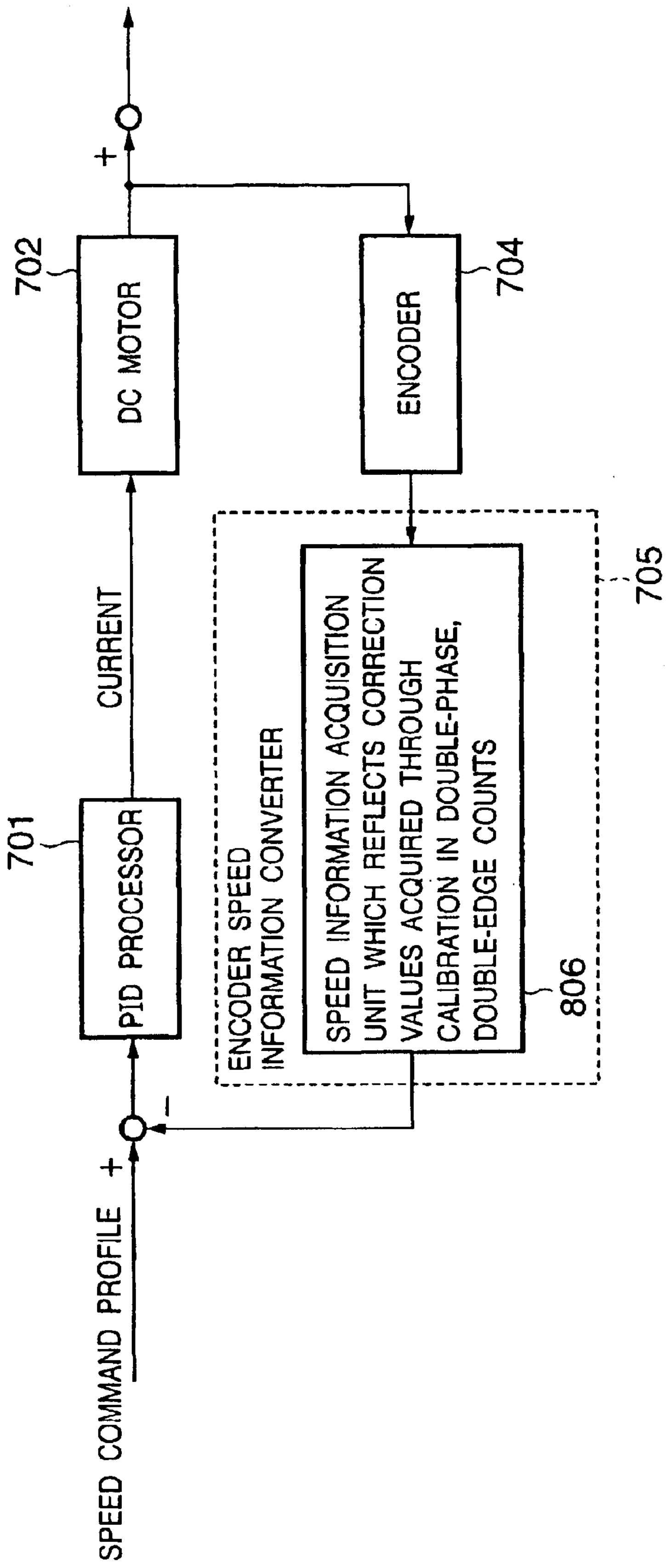
FIG. 8 is a PID-based control block diagram for controlling motor speed using corrected control commands.

FIG. 8 is a PID-based control block diagram for controlling motor speed using corrected control commands. This differs from the block diagram of FIG. 7 in the use of a speed information acquisition unit 806 as the encoder speed information converter 705 to reflect the coefficient values determined through the calibration to double-phase, double-edge counts described with reference to FIG. 5. Consequently, unlike the speed control in FIG. 7, the speed control in FIG. 8 allows constant-speed driving at a far lower speed than conventional methods.

[Relationship Between Calibration Process and Correction Process (FIG. 9)]

Figure 9:
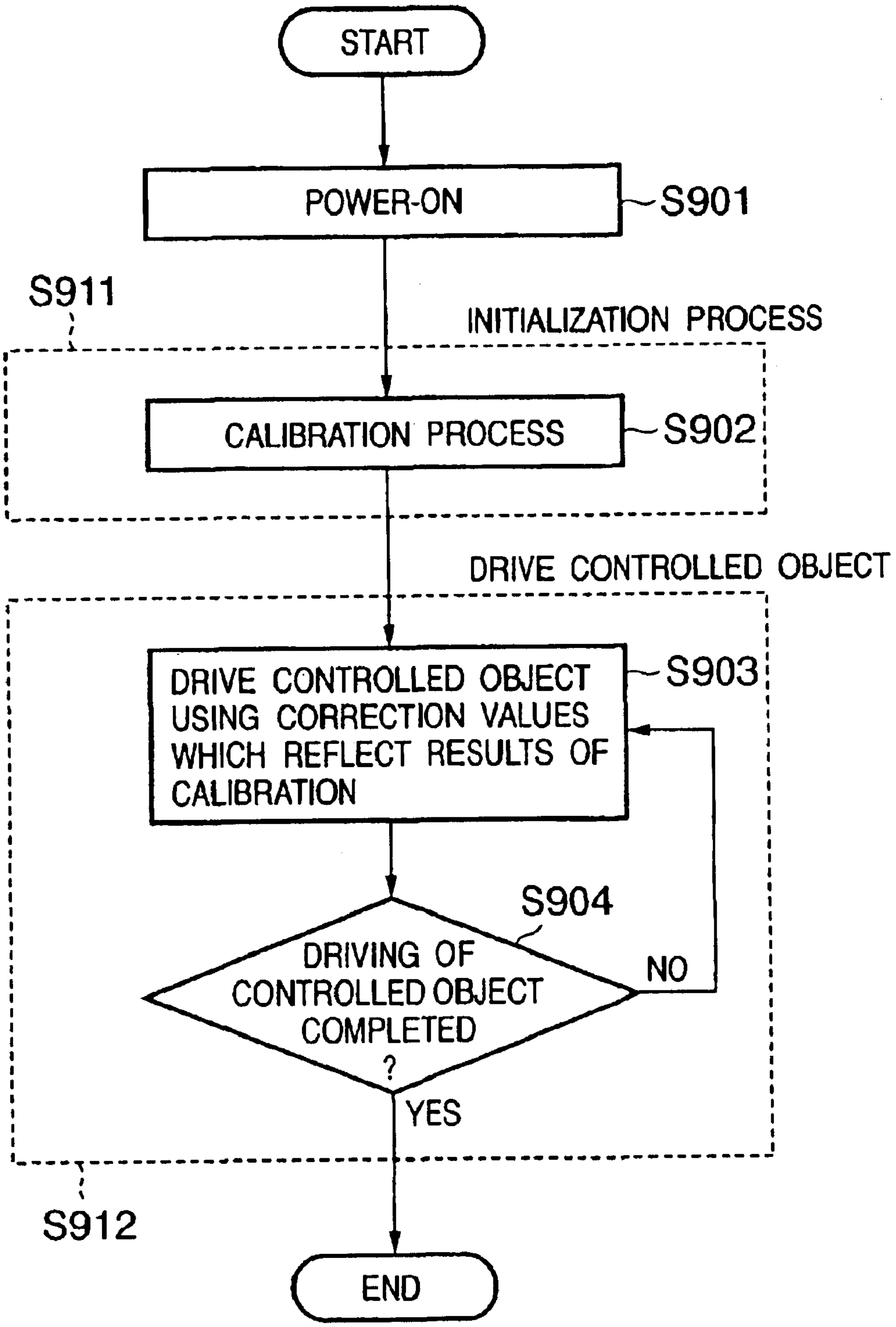
FIG. 9 is a diagram illustrating a relationship between the calibration process and correction process.

FIG. 9 is a diagram illustrating a relationship between a calibration process and correction process. When a controlled object is powered on in Step S901, the flow goes to Step S911 for a power-on sequence in the controlled object. In the case of a serial ink jet printer, Step S911 includes, for example, initialization of a paper feed mechanism, recovery of an ink jet head, etc. During the initialization process in Step S911, a calibration process (Step S902) is performed as part of the initialization process of the DC motor.

When a series of initialization processes in Step S911 is completed, control for driving the controlled object is started (Step S912). In the case of a serial ink jet printer, this control includes control for recording. For example, if a DC motor is used as the transport motor 1709 (FIG. 13) for transporting the recording medium, this DC motor constitutes the controlled object and the motor is controlled using correction coefficient values which reflect the results of the calibration process (Step S902) to transport the recording medium (Step S903).

Although Step S903 has been described, taking a transport motor for recording media as an example, it is not limited to the example and similarly applies to motors used as driving sources in other recording apparatus.

In Step S904, it is judged whether the driving of the controlled object in response to control input is complete. If it is not complete (S904: NO), feedback control using the coefficient values calculated in Step S903 is continued. If the driving is complete (S904: YES), the processing is finished.

[Details of Calibration Process (FIG. 10)]

Figure 10:
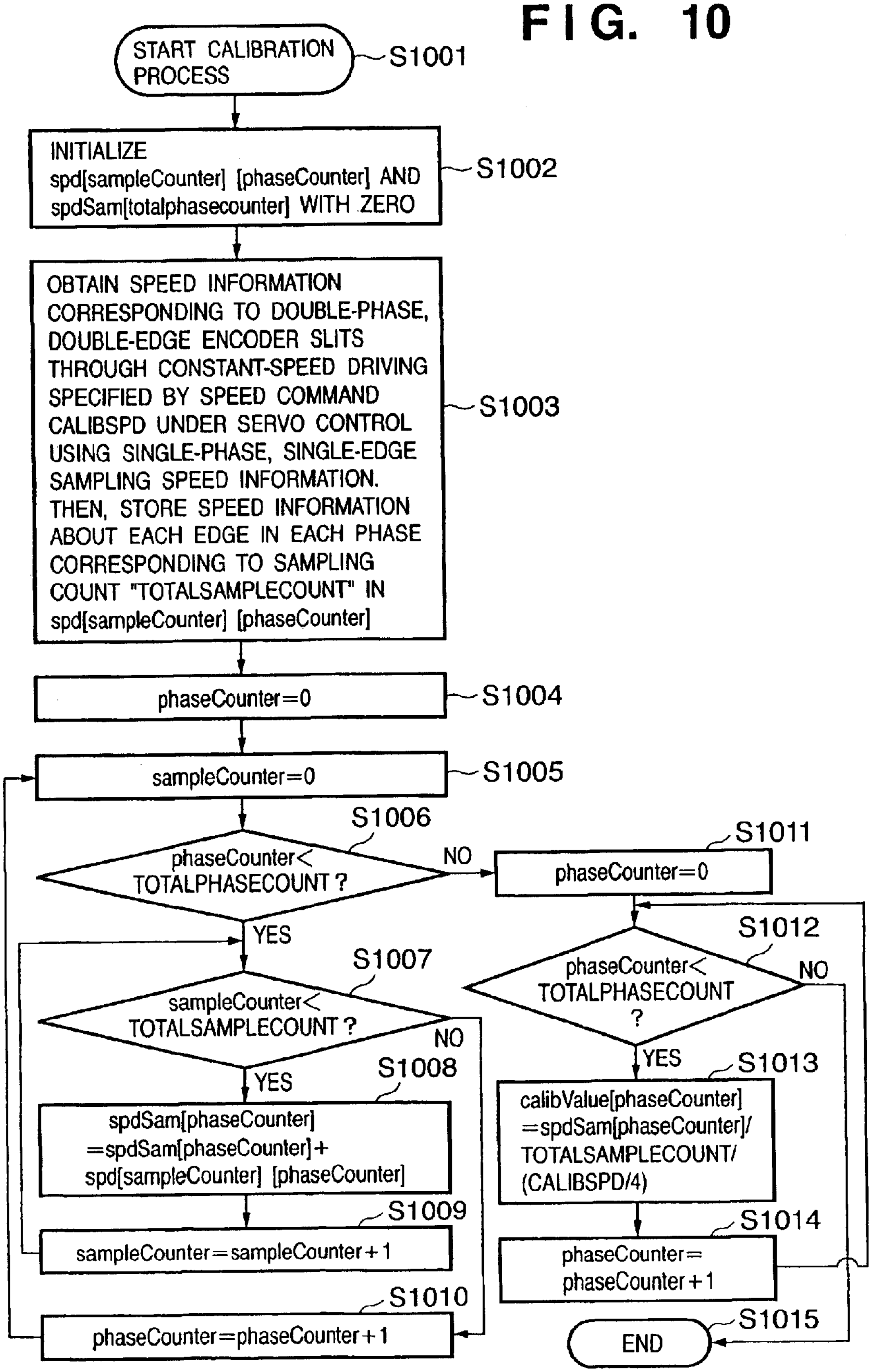
FIG. 10 is a flowchart illustrating details of the calibration process (S902)

FIG. 10 is a flowchart illustrating details of the calibration process (S902).

When the calibration process is started in Step S1001, the flow goes to Step S1002, where speed history information storage area spd[sampleCounter][phaseCounter] and working area spdSam[totalphasecounter] for calculating speed information are initialized.

The values stored in [sampleCounter] are, for example, 0 to 9, which represent the sampling counts at rises and falls in phases A and B.

On the other hand, [phaseCounter] contains 0 to 3, which represent all possible combinations of a double phase and double edge. Generally there are four combinations: rise in phase A, fall in phase A, rise in phase B, and fall in phase B. Thus, in the speed history information storage area spd, 40 pieces of speed information are stored at locations determined by the values of [sampleCounter] and [phaseCounter].

In Step S1003, speed control is performed using the speed information generated based on the single-phase, single-edge sampling counts described with reference to FIG. 7. The controlled object is driven at a predetermined constant speed suitable for sampling. At this speed, a single-phase, single-edge interval (e.g., an interval from a rising edge in phase A to the next rising edge detected in phase A) is designated as CALIBSPD.

Incidentally, this is not limited to the rising edges in phase A, and may also be applied to the falling edges in phase A or rising edges in phase B.

Under the above conditions, speed information in int2 to int5 in FIGS. 4A to 4D (double-phase, double-edge speed information) is detected.

Values corresponding to double-edge encoder slits in each phase are stored in spd[sampleCounter][phaseCounter] as edge-to-edge speed information.

For example, spd[0][0]=a, spd[0][1]=b, spd[0][2]=c, spd[0][3]=d, spd[1][0]=a', spd[1][1]=b', . . . , spd[9][2]=c", spd[9][3]=d" are stored.

In Step S1004, a counter phaseCounter is initialized to "0."

In Step S1005, a counter sampleCounter is initialized to "0."

If it is found in Step S1006 that phaseCounter<TOTALPHASECOUNT (S1006: YES), the flow goes to Step S1007.

Steps S1007 to S1010 are repeated to determine the values of spdSam[phaseCounter] described above.

If it is found in Step S1007 that sampleCounter<TOTALSAMPLECOUNT (e.g., 10) (S1007: YES), the flow goes to Step S1008.

In Step S1008, information in spd[sampleCounter][phaseCounter] is stored in spdSam[totalphaseCounter] and totaled. The value "a" is read out of spd[0][0] and stored in spdSam[totalphaseCounter], specifically, in spdSam[0].

In Step S1009, sampleCounter is incremented by 1. Then, the flow goes to Step S1007, where it is judged whether the value of sampleCounter is smaller than 10. Since the judgement is YES, the flow goes to Step S1008. The value "a" is read out of spd[1][0] and added to the value stored in spdSam[0]. The result of addition is stored in spdSam[0].

This process is repeated until the value in spd[9][0] is added to spdSam[0].

After the value in spd[9][0] is added to spdSam[0], since the judgement in Step S1007 is NO, phaseCounter is incremented by 1.

Then, the flow returns to Step S1005. In Step S1008, the value of spd[0][1] is added to spdSam[1], and subsequently, spd[1][1] to spd[9][1] are added to spdSam[1] in the manner described above.

Additions are performed in spdSam[2], and then in spdSam[3] until the value of phaseCounter becomes 4 in S1006.

Through the above processes, spdSam[0], spdSam[1], spdSam[2], and spdSam[3] are determined for the sampled data.

If the judgement in Step S1006 is NO, the flow goes to Step S1011. PhaseCounter is initialized to "0" (S1011) and an average value (spdSam[phaseCounter]/10) is calculated by dividing the information stored in spdSam[0], spdSam[1], spdSam[2], and spdSam[3] by TOTALSAMPLECOUNT (S1012).

Then, to convert CALIBSPD which corresponds to the predetermined speed into double-phase, double-edge units, the above described average value is divided by "CALIBSPD/4." This gives the deviation of the detected speed information from the predetermined speed as a ratio. The ratio is stored in calibValue[0].

This ratio is the very correction value (coefficient value) determined by this calibration (S1013).

In Step S1014, correction values (coefficient values) (calibValue[1], calibValue[2], calibValue[3]) corresponding to values (1, 2, 3) of phaseCounter are calculated by adding the values of phaseCounter.

When all the correction values (coefficient values) are determined (S1012: NO), the processing is finished.

The value of TOTALPHASECOUNT is not limited to 10.

[Details of Correction Process (FIG. 11)]

Figure 11:
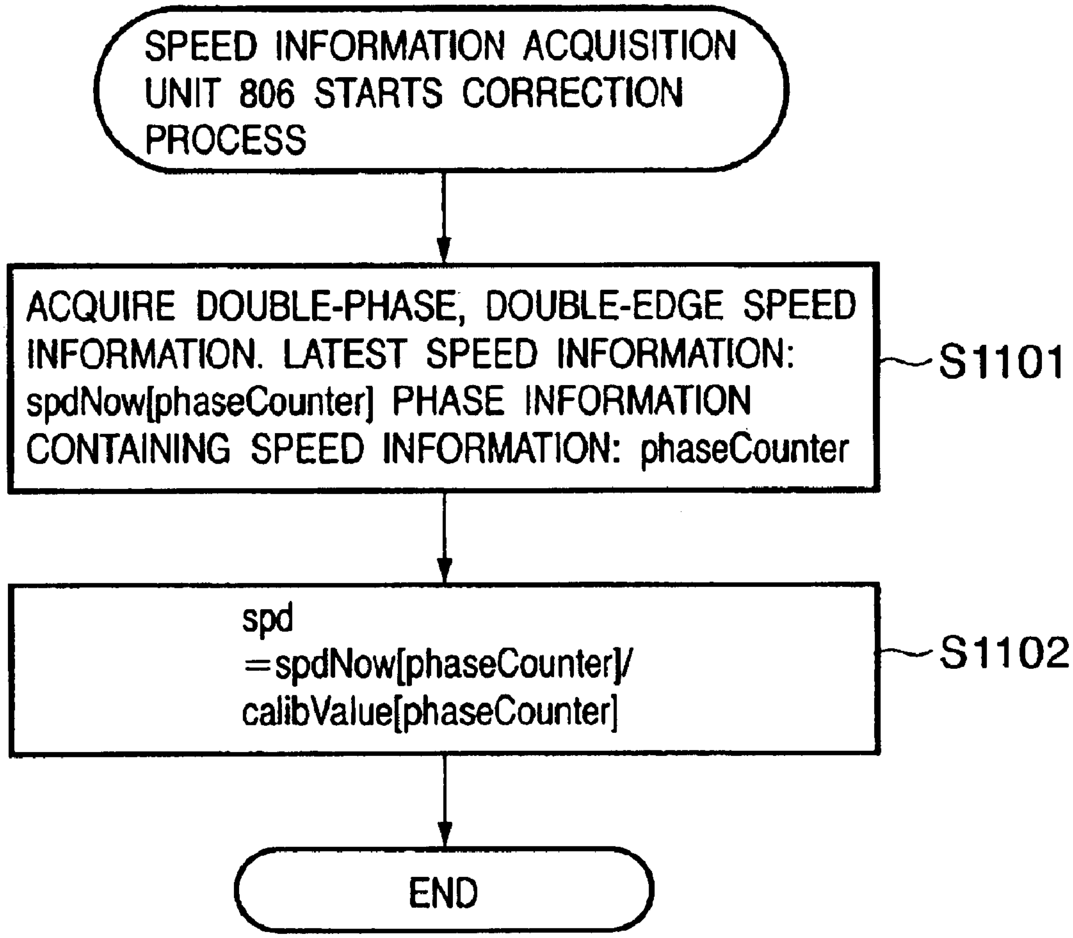
FIG. 11 is a flowchart illustrating a flow of processes performed by a speed information acquisition unit 806 (FIG. 8) which generates speed information by reflecting correction coefficient values acquired through the calibration process described in FIG. 10.

FIG. 11 is a flowchart illustrating a flow of processes performed by the speed information acquisition unit 806 (FIG. 8) which generates speed information by reflecting the correction coefficient values acquired through the calibration process described in FIG. 10.

In Step S1101, the latest speed information about each combination of rising and falling edges in each phase is stored in spdNow[phaseCounter]. This is done through the speed information storage 612 (FIG. 6) using the configuration shown in FIG. 6 and stored in spdNow[phaseCounter].

In Step S1102, accurate speed information is calculated by dividing the speed information spdNow[0] by the correction coefficient value calibValue[0] obtained in the calibration process.

Similarly, accurate speed information is calculated using calibValue[1] for spdNow[1], calibValue[2] for spdNow[2], and calibValue[3] for spdNow[3].

The deviation of the speed information corrected here from the speed command profile is input in the PID processor 701 in the block diagram shown in FIG. 8.

As described above, when obtaining control information from encoder output signals, this embodiment allows double-phase, double-edge sampling data to be corrected to control the motor with speed information as accurate as that obtained by the single-phase, single-edge sampling method.

Also, this embodiment can make the update interval of control information shorter than in the case of single-phase, single-edge sampling, and thus can stabilize motor control.

Incidentally, in the above embodiment, it has been explained that the liquid contained in the ink tank is ink which forms the droplets discharged from the recording head of the recording apparatus, but the liquid is not limited to ink. For example, the ink tank may contain a treating liquid which is discharged onto the recording media to improve fixability, water resistance, and/or quality of recorded images.

Among ink jet recording apparatus, the above embodiment, in particular, comprises means for generating thermal energy (e.g., an electrothermal converting element, laser beam, etc.) used to discharge ink and can achieve high-density, high-resolution recording using a method which causes changes in the state of ink by means of the thermal energy.

Regarding typical configurations and principles, the basic principle disclosed in U.S. Pat. No. 4,723,129 or U.S. Pat. No. 4,740,796 is used preferably. This method is applicable to both so-called on-demand type and continuous type. For the on-demand type, in particular, this method is effective in that by applying at least one drive signal to electrothermal converting elements arranged corresponding to liquid (ink) holding sheets or liquid paths, with the drive signal causing rapid temperature rises above nucleate boiling according to recorded information, this method can make the electrothermal converting elements generate thermal energy to cause film boiling on the heating surface of the recording head, and thereby can form bubbles in the liquid (ink) in one-to-one correspondence with the drive signals.

Through expansion and contraction of the bubbles, the liquid (ink) is discharged through discharge openings, forming at least one droplet. More preferably, the drive signals are pulsed because pulsed drive signals can cause the bubbles to expand and contract instantly and properly, achieving highly responsive liquid (ink) discharge.

As the pulsed drive signals, those disclosed in U.S. Pat. Nos. 4,463,359 and 4,345,262 are suitable. Regarding the rate of temperature increase of the heating surface, the use of the conditions described in U.S. Pat. No. 4,313,124 will allow better recording.

Regarding a full line recording head whose length corresponds to the maximum width of the recording medium which the recording apparatus can record, the entire width may be covered by a combination of recording heads as disclosed in the above-mentioned specifications or by an integrally-formed single-piece recording head.

In addition, the present invention may use not only the cartridge type recording head which incorporates an ink tank as described in the above embodiment, but also a replaceable chip type recording head which is connected electrically with the main unit and supplied with ink when mounted on the main unit.

Also, in terms of further stabilizing recording operations, it is preferable to add head recovery means and preliminary means to the configuration of the recording apparatus described above. Specific examples of such means include capping means, cleaning means, pressure or suction means for the recording head as well as preheating means employing an electrothermal converting element, heating element, or combination thereof. Besides, preliminary discharge mode separate from the discharge mode for recording will be useful for stable recording.

Regarding recording modes, the recording apparatus may be provided with not only a recording mode which uses only a main color such as black, but also one of the following modes regardless of whether the recording head is composed of multiple heads or configured as a single-piece unit: multi-color mode using different colors and full-color mode using color mixtures.

Although it is assumed in the above embodiment that the ink is liquid, it is also possible to use an ink which solidifies at or below room temperature or an ink which softens or liquefies at room temperature. In the case of ink jet recording, since it is common practice to adjust the temperature of the ink within a range between 30° C. and 70° C., and thereby keep the viscosity of the ink within a range which will allow stable discharge, it is sufficient if the ink is in a liquid state only when it is used with recording signals provided.

In addition, in order to prevent temperature rise intentionally by spending thermal energy intentionally on the solid-to-liquid phase change as well as to prevent evaporation of the ink, it is also possible to use an ink which remains solid when allowed to stand and liquefies when heated. Anyway, the present invention can adopt the types of ink which liquefy when thermal energy is provided, including ink which is liquefied and discharged in the form of liquid ink when thermal energy is provided in accordance with recording signals and ink which starts to solidify when it approaches the recording medium.

[Other Embodiment]

The motor control according to the present invention may be applied either to a system consisting of two or more apparatus (e.g., a host computer, interface devices, a reader, a printer, and the like) or to equipment consisting of a single apparatus (e.g., a copier, facsimile machine, or the like).

As described above, the present invention makes it possible to implement motor control which corrects double-phase, double-edge sampling data, and thereby achieves detection accuracy equivalent to that achievable by a conventional, single-phase, single-edge sampling method when obtaining control information from encoder output signals.

It also makes it possible to stabilize motor control by updating control information at shorter intervals than the conventional, single-phase, single-edge sampling method.

As many apparently widely different embodiments of the present invention can be made without departing from the spirit and scope thereof, it is to be understood that the invention is not limited to the specific embodiments thereof except as defined in the claims.

What is claimed is:

1. A motor control apparatus comprising:

pulse signal generating means for generating a first pulse signal whose period corresponds to the speed at which a driven object moves and a second pulse signal out of phase with the first pulse signal;

edge detection means for detecting rising edges and falling edges of the first and second pulse signals;

edge interval information acquisition means for acquiring information about intervals between the edges of either the first or second pulse signal detected by the edge detection means and the edges of the other pulse signal detected next;

correction value acquisition means for acquiring correction values for the intervals between the edges of either the first or second pulse signal and the edges of the other pulse signal detected next; and control means for controlling movement of the driven object based on the information acquired by the edge interval information acquisition means and on the correction values.

2. The motor control apparatus according to claim 1, wherein the edge interval information acquisition means acquires:

first edge interval information about the interval from a rising edge of the first pulse signal to a rising edge of the second pulse signal;

second edge interval information about the interval from a rising edge of the second pulse signal to a falling edge of the first pulse signal;

third edge interval information about the interval from a falling edge of the first pulse signal to a falling edge of the second pulse signal; and fourth edge interval information about the interval from a falling edge of the second pulse signal to a rising edge of the first pulse signal.

3. The motor control apparatus according to claim 2, wherein the correction value acquisition means calculates respective correction values for the first, second, third, and fourth edge interval information.

4. The motor control apparatus according to claim 3, wherein the correction value acquisition means calculates the correction values based on the first, second, third, and fourth edge interval information as well as on information about edge intervals between rising edges or falling edges of either the first or second pulse signal, when the driven object is moved at a predetermined speed.

5. The motor control apparatus according to claim 3, wherein the correction value acquisition means comprises storage means for storing multiple pieces each of the first, second, third, and fourth edge interval information.

6. The motor control apparatus according to claim 5, wherein the correction value acquisition means comprises calculation means for calculating respective average values for the first, second, third, and fourth edge interval information using values stored in the storage means.

7. The motor control apparatus according to claim 6, wherein the correction value acquisition means calculates respective correction values for the first, second, third, and fourth edge interval information by dividing the respective average values of the first, second, third, and fourth edge interval information and single-edge interval information about either the first or second pulse signal by the number of single-edge intervals.

8. The motor control apparatus according to claim 3, wherein the control means uses the first, second, third, and fourth edge interval information acquired by the edge interval information acquisition means as well as the correction values for the respective edge interval information.

9. A control method for a motor control apparatus, the control method comprising:

a pulse signal generating step of generating a first pulse signal whose period corresponds to the speed at which a driven object moves and a second pulse signal out of phase with the first pulse signal;

an edge detection step of detecting rising edges and falling edges of the first and second pulse signals;

an edge interval information acquisition step of acquiring information about intervals between the edges of either the first or second pulse signal detected in the edge detection step and the edges of the other pulse signal detected next;

a correction value acquisition step of acquiring correction values based on information about the intervals between the edges of either the first or second pulse signal and the edges of the other pulse signal detected next as well as on information about edge intervals between rising edges or falling edges of either the first or second pulse signal; and a control step of controlling movement of the driven object based on the information acquired in the edge interval information acquisition step and on the correction values.

10. A motor control method, comprising:

a pulse signal generating step of generating a first pulse signal whose period corresponds to the speed at which a driven object moves and a second pulse signal out of phase with the first pulse signal;

an edge detection step of detecting rising edges and falling edges of the first and second pulse signals;

an edge interval measuring step of measuring intervals between edges of either the first or second pulse signal and the edges of the other pulse signal detected next as well as intervals between rising edges or falling edges of either the first or second pulse signal when the driven object moves at a predetermined constant speed;

a calculation step of calculating correction values for the intervals between the edges of either the first or second pulse signal and the edges of the other pulse signal detected next, based on information about the edge intervals measured in the edge interval measuring step; and a control step of controlling movement speed of the driven object based on the correction values.

11. A recording apparatus which performs recording by causing a carriage carrying a recording head to scan over a recording medium, based on information transmitted from an external device, the recording apparatus comprising:

recording data generating means for converting the information transmitted from the external device into recording data compatible with a configuration of the recording head;

pulse signal generating means for generating a first pulse signal whose period corresponds to a transport speed of the recording medium and a second pulse signal out of phase with the first pulse signal; and control means for controlling the scanning of the recording head and transport of the recording medium, wherein the control means comprises:

edge detection means for detecting rising edges and falling edges of the first and second pulse signals;

edge interval information acquisition means for acquiring information about intervals between the edges of either the first or second pulse signal detected by the edge detection means and the edges of the other pulse signal detected next;

correction value acquisition means for acquiring correction values for the intervals between the edges of either the first or second pulse signal and the edges of the other pulse signal detected next; and second control means for controlling movement of the recording apparatus based on the information acquired by the edge interval information acquisition means and on the correction values.

12. The recording apparatus according to claim 11, wherein the recording head is an ink jet recording head which discharges ink for recording.

13. The recording apparatus according to claim 11, wherein the recording head uses thermal energy to discharge ink and comprises a thermal energy converter for generating the thermal energy to be applied to the ink.

14. A recording apparatus which performs recording by causing a carriage carrying a recording head to scan over a recording medium based on information transmitted from an external device, the recording apparatus comprising:

recording data generating means for converting the information transmitted from the external device into recording data compatible with a configuration of the recording head; and a controller which controls the scanning of the recording head and transport of the recording medium, wherein the controller comprises:

detection means for detecting first pulse information which corresponds to a speed of the scanning or transport and second pulse information out of phase with the first pulse information;

edge detection means for detecting rising edges and falling edges of the detected first pulse information and second pulse information;

edge interval measuring means for measuring edge-to-edge periods using the detected rising edges and falling edges;

calibration means for calibrating the measured edge-to-edge periods with a reference period for driving a driven object at constant speed;

correction means for correcting the first pulse information and second pulse information based on the calibration; and control means for generating control commands to drive the driven object based on the corrected first pulse information and second pulse information.

15. The recording apparatus according to claim 14, wherein the recording head is an ink jet recording head which discharges ink for recording.

16. The recording apparatus according to claim 14, wherein the recording head uses thermal energy to discharge ink and comprises a thermal energy converter for generating the thermal energy to be applied to the ink.

* * * * *